United States Patent [19]

Shimizu

[11] Patent Number: 4,930,123
[45] Date of Patent: May 29, 1990

[54] METHOD FOR CONTROLLING ADDRESS PARAMETERS FOR INTERCONNECTING LAN AND ISDN

[75] Inventor: Hiroshi Shimizu, Tokyo, Japan

[73] Assignee: NEC Corporation, Tokyo, Japan

[21] Appl. No.: 319,250

[22] Filed: Mar. 6, 1989

[30] Foreign Application Priority Data

Mar. 4, 1988 [JP] Japan .................................. 63-52155
Mar. 4, 1988 [JP] Japan .................................. 63-52156

[51] Int. Cl.$^5$ .............................................. H04J 3/26
[52] U.S. Cl. .................................. 370/94.1; 370/110.1
[58] Field of Search ................. 370/94.1, 110.1, 85.13, 370/85.4

[56] References Cited

U.S. PATENT DOCUMENTS 4,700,340 10/1987 Beranek et al. ........................ 370/60

Primary Examiner—Douglas W. Olms
Assistant Examiner—Christopher O. Edwards
Attorney, Agent, or Firm—Sughrue, Mion, Zinn, Macpeak & Seas

[57] ABSTRACT

In a system interconnecting a LAN and an ISDN to which data terminals of the LAN are accessible through a common interface, a network-to-terminal LAPD packet is transmitted from the interface to the data terminals, containing a TEI value of group address, a destination address of a group address of the data terminals and an action indicator set to an assigned TEI value. The data terminal specified by the assigned TEI value transmits a packet containing the address of the interface and a TEI value equal to the assigned TEI value. In addition, the interface creates a table describing a relationship between a TEI value and a source address both contained in a terminal-to-network LAPD packet. An address stored in the table is recalled in response to a TEI value contained in an LAPD signal from the network and entered to this LAPD signal as a destination address to form a network-to-terminal LAPD packet for transmission to the data terminals.

12 Claims, 4 Drawing Sheets

FIG. 3a  | DA | SA | SAPI | TEI | C | INFO | FCS |

FIG. 3b  | DA | SA | DSAP | SSAP | C | INFO | FCS |

FIG. 4

| SAPI | TEI | C | INFO | FCS |

| MANAGEMENT ENTITY IDENTIFIER |
| REFERENCE NUMBER (Ri) |
| MESSAGE TYPE |
| ACTION INDICATOR (Ai) | 1 |

FIG. 5

USER SIDE → ASP

UI (SAPI, TEI) [ID request, Ri, Ai]

UI (SAPI, TEI) [ID assigned, Ri, Ai]

TIME

LEGEND: ( ) Address field
[ ] Information field

FIG. 7

USER SIDE — ISDN INTERFACE 4 — ASP

DA = Group address
SA = Interface address

UI (SAPI, TEI) [ID check request, Ri, Ai]

DA = Interface address
SA = Terminal address

UI (SAPI, TEI) [ID check response, Ri, Ai]

TIME

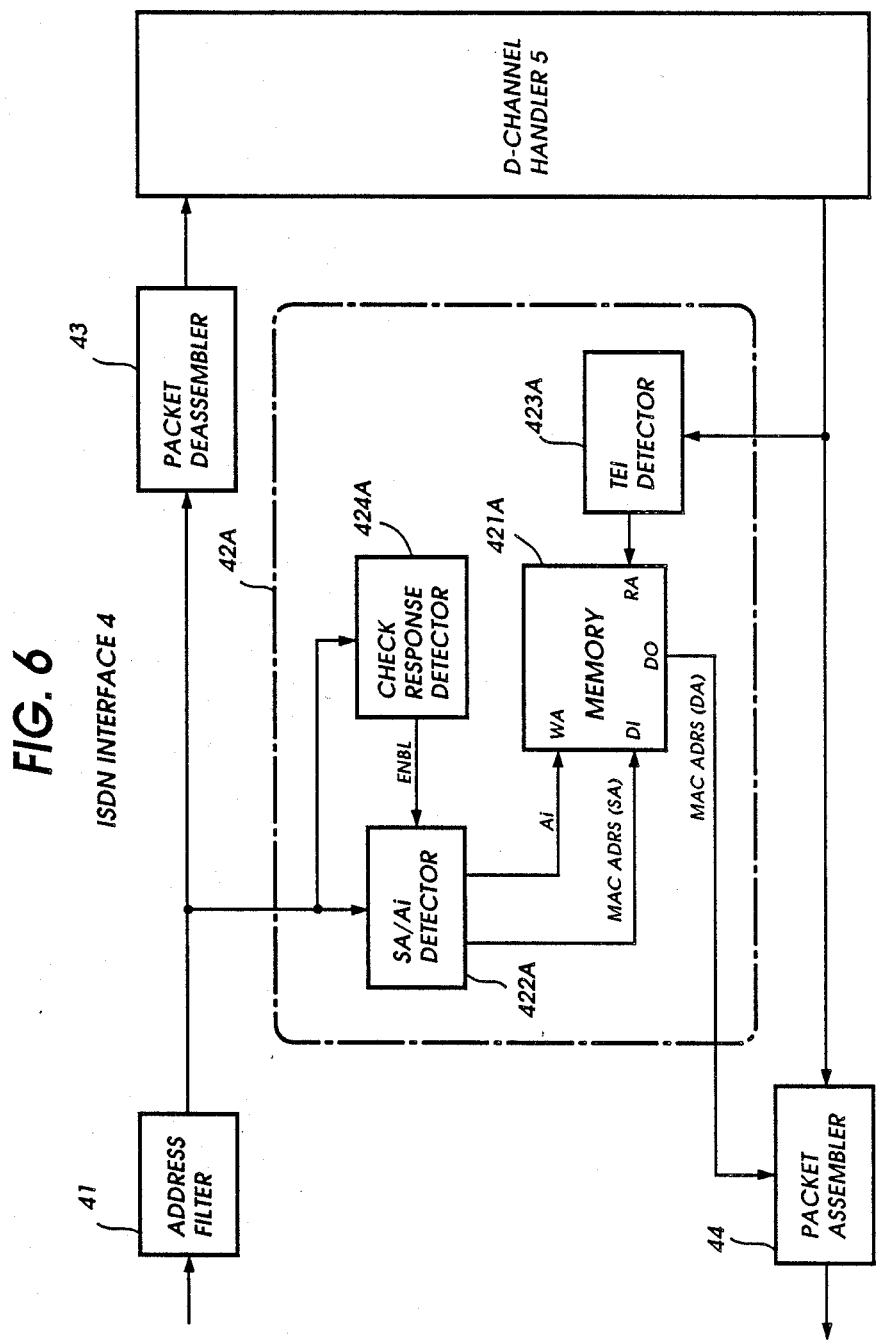

METHOD FOR CONTROLLING ADDRESS PARAMETERS FOR INTERCONNECTING LAN AND ISDN

BACKGROUND OF THE INVENTION

The present invention relates to address management for a local area network (LAN) connected to an ISDN (Integrated Services Digital Network).

Interconnection of LANs and an ISDN is an important factor for the expansion of the digital network on a nationwide scale as well as on an international scale because their combined capabilities will ensure a wide range of future communications services. However, no efficient interconnecting method has hitherto been proposed. Furthermore, additional procedures would be needed for exchanging the necessary address information between LAN and ISDN.

SUMMARY OF THE INVENTION

It is therefore an object of the present invention to provide a method and a system for efficiently interconnecting a LAN and an ISDN.

Another object of the present invention is to provide a method and a system for controlling the management of addresses and Terminal Endpoint Identifier (TEI) values for a system comprising a LAN and an ISDN.

According to a first aspect of the present invention, a method is provided for interconnecting a plurality of data terminals of a local area network and an ISDN. The ISDN is capable of assigning Terminal Endpoint Identifier (TEI) values respectively to data terminals which are accessible through a common interface unit to the network. Each of the data terminals is assigned an address value and capable of receiving a packet containing a TEI value assigned thereto and transmitting a terminal-to-network LAPD (Link Access Protocol on the D-channel) packet to the interface unit, containing its own address value and a TEI value assigned to it. The interface unit is preassigned an address value and transmits a network-to-terminal LAPD packet to the data terminals, containing a TEI value of group address, a destination address value of the group address of the data terminals and an action indicator set to an assigned TEI value specifying one of the data terminals. The data terminal which is specified by the assigned TEI value of the action indicator transmits a terminal-to-network LAPD packet containing the address value of the interface unit, regardless of a TEI value contained in the lastmentioned packet.

According to a second aspect of the invention, a method is provided for controlling the management of addresses for an ISDN capable of assigning ISDN address values respectively to a plurality of data terminals which are accessible through a common interface unit to the network, each of the data terminals being preassigned an address value and capable of receiving a packet containing an ISDN address value assigned thereto and transmitting a terminal-to-network LAPD packet to the interface unit, the terminal-to-network LAPD packet containing the address value of the transmitting data terminal and an ISDN address value assigned to the transmitting data terminal. A terminal-to-network LAPD packet is received by the interface unit to create a table describing a relationship between an ISDN address value and a source address value both contained in the received LAPD packet. An LAPD signal from the network is received by the interface unit to recall an address value from the table in response to an ISDN address value contained in the received LAPD signal. The recalled address value is entered to the received LAPD signal as a destination address to form a network-to-terminal LAPD packet, which is transmitted to the data terminals.

According to a third aspect, a method is provided for controlling the management of TEI values for an ISDN capable of assigning TEI values respectively to a plurality of data terminals which are accessible through a common interface unit to the network, each of the data terminals being preassigned an address value and capable of receiving a packet containing a TEI value assigned thereto and transmitting a terminal-to-network LAPD packet to the interface unit, the terminal-to-network LAPD packet containing the address value of the transmitting data terminal and a TEI value assigned to the transmitting data terminal. The terminal-to-network LAPD packet is received by the interface unit to create a table describing a relationship between the TEI value and address value both contained in the received LAPD packet. An address value is recalled from the table in response to a TEI value contained in a received LAPD signal from the network and entered to the received LAPD signal as a destination address to form a network-to-terminal LAPD packet, which is transmitted to the data terminals.

According to a fourth aspect, a method is provided for controlling the management of TEI values for an integrated services digital network (ISDN) capable of assigning TEI values respectively to a plurality of data terminals which are accessible through a common interface unit to the network, each of the data terminals being preassigned an address value and capable of receiving a packet containing a TEI value value assigned thereto and transmitting a terminal-to-network LAPD packet to the interface unit, the terminal-to-network LAPD packet containing the address value of the transmitting data terminal and a TEI value value assigned to the transmitting data terminal. A terminal-to-network LAPD packet of a TEI check response is detected by the interface unit to create a table describing a relationship between a source address value and a TEI value of an action indicator both contained in the TEI check response. An address value is recalled from the table in response to a TEI value contained in the LAPD signal from the network and entered to a LAPD signal received from the network as a destination address and a network-to-terminal LAPD packet is derived therefrom and transmitted to the data terminals.

BRIEF DESCRIPTION OF THE DRAWINGS

The present invention will be described in further detail with reference to the accompanying drawings, in which:

FIG. 3a is an illustration of the data structure of packets exchanged between data terminals and the ISDN of the present invention, and FIG. 3b is an illustration of the data structure of packets exchanged between terminals of conventional local area networks;

FIG. 4 is an illustration of the data structure of ISDN's LAPD (Link Access Protocol on the D-channel) frame;

FIG. 5 is an illustration of a TEI assignment procedure according to the CCITT Recommendation I. 441;

FIG. 6 is a block diagram of an ISDN interface unit according to a modified embodiment of the present invention; and FIG. 7 is an illustration of a check routine procedure associated with the embodiment of FIG. 6.

DETAILED DESCRIPTION

Figure 1:
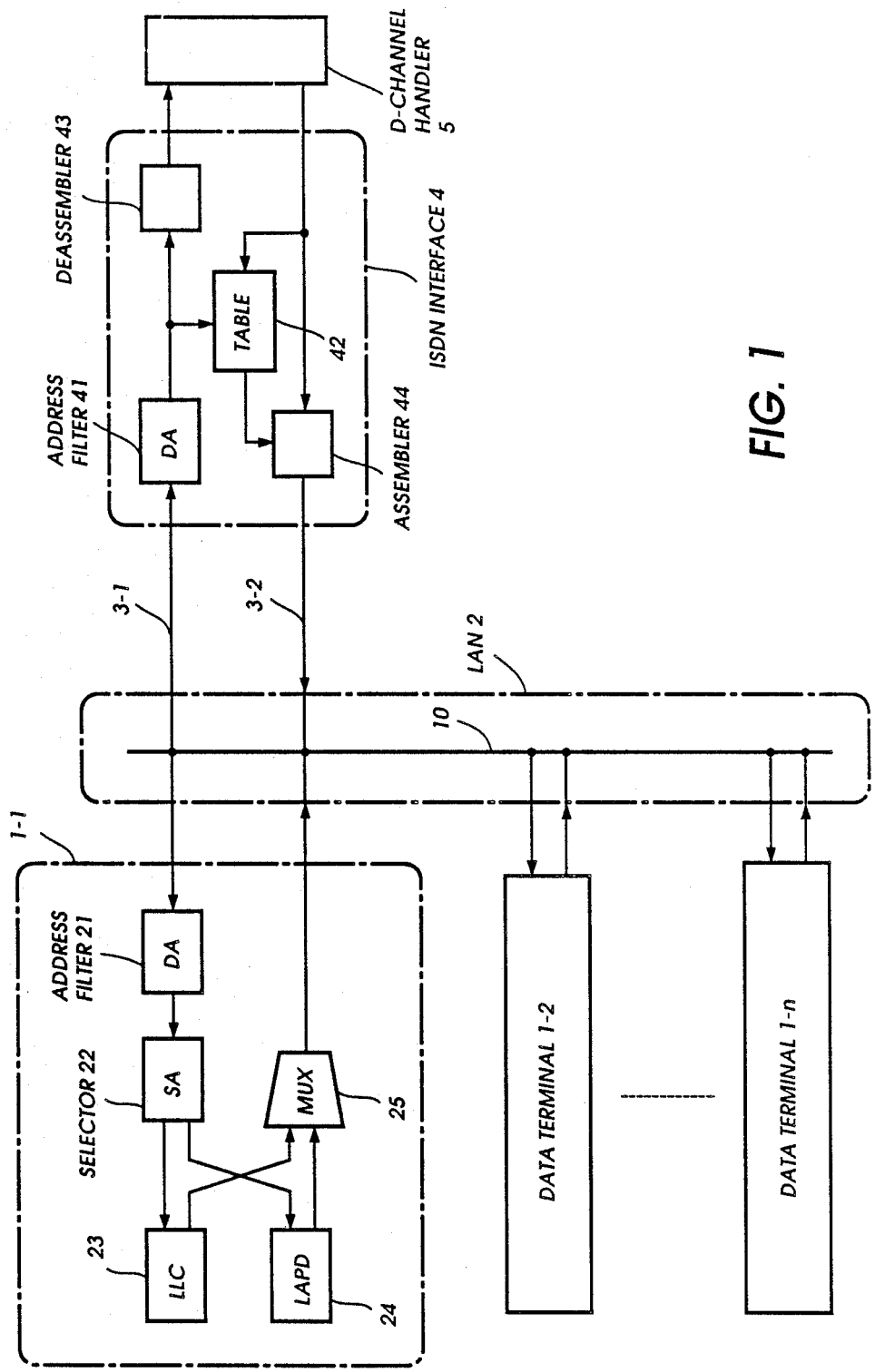
FIG. 1 is a block diagram of an embodiment of the present invention.

Before going into the details of the present invention description will first be made of a problem associated with a proposed method of interconnecting an ISDN and a local area network, particularly to the problem associated with integration of ISDN packets, such as LAPD (Link Access Protocol on the D-channel) packets containing a LAN's MAC (Medium Access Control) address, with packets of other services. To meet the CCITT (International Telegraph and Telephone Consultative Committee) Recommendation I. 441, the LAPD packet should include a Service Access Point Identifier (SAPI), a Terminal Endpoint Identifier (TEI), a control field (C) and an information field (INFO) and encapsulate them with MAC address fields, i.e., destination address (DA) and source address (SA) fields and a frame check sequence (FCS) as shown in FIG. 3a. The proposed LAPD packet is then treated as a LAN packet whose data structure is shown in FIG. 3b. This LAN packet consists of a frame including a Destination Service Access Point (DSAP) identifier and a Source Service Access Point (SSAP) identifier, with the frame being encapsulated with DA and SA fields of the Medium Access Control layer of the local area network. In these figures, starting and ending delimiters are omitted for purposes of simplicity.

Unlike the DA and SA fields of the LAN protocols, the TEI value of the ISDN protocols may change with calls or different TEI values may be assigned to a single data terminal equipment. According to the procedures for the assignment and removal of Terminal Endpoint Identifier as specified by the CCITT Recommendation I. 441, paragraph 5.3, a LAPD frame consists of an SAPI field, TEI field, a control field, and a TEI assignment information field which are encapsulated with a frame check sequence as shown in FIG. 4. The information field of the LAPD frame contains a management entity identifier (ID), reference number (Ri), a message type and an action indicator (Ai). According to the CCITT TEI assignment procedure, an unnumbered command frame (UI) is transmitted from the user side of the network to an ISDN assignment source point (ASP) by setting an SAPI value to 63 (binary "11 1111" indicating TEI assignment control), a TEI value to 127 (binary "111 1111"), an ID value to 15 (binary "0000 1111"), a message type value to binary "0000 0001" (indicating identity request), an Ri value to a random number in the range between 0 and 65535, and an Ai value to a preferred TEI value. The assignment service point of the network returns an unnumbered response frame (UI) by setting the SAPI value to 63 (binary "11 1111" indicating TEI assignment control), the TEI value to 127 (binary "11 1111"), the ID value to 15 (binary "0000 1111"), the message type value to binary "0000 0010" (indicating identity assigned), the Ri value to that set in the user's command packet and setting the Ai value to an assigned TEI value (see FIG. 5).

The proposed interconnection between a local area network and an ISDN involves a procedure in which a calling data terminal enters the address (on the LAN's medium access control layer) of an ISDN interface into the destination address field (DA) of a LAPD packet (FIG. 3a) and enters the terminal's MAC address into the source address field (SA) of the packet, encapsulates them with an unnumbered command frame (ID request) prepared in a manner as mentioned above and transmits the packet to an assignment source point (ASP), which is a management entity on the network side of the system.

However, one disadvantage of the proposed method requires additional procedures for establishing a one-to-one correspondence between TEI values assigned to LAN's data terminals and their addresses in the medium access control layer of the LAN's protocols. Another disadvantage is that it is neccessary to provide additional procedures for assigning a TEI value.

Referring now to FIG. 1, there is shown a block diagram of a communication system according to an embodiment of the present invention. The system includes a plurality of data terminal equipments 1—1 through 1-n connected to the bus 10 of a local area network 2. Bus 10 is connected to a common ISDN interface unit 4 which is connected to an ISDN servers, or D-channel handler 5 which processes signals in accordance with the CCITT Recommendations I. 441 and I. 451 and in which the assignment service point of the network is provided.

Each data terminal equipment, or simply a data terminal, has a receive section comprising an address filter 21 connected to bus 10 for detecting a destination address contained in a received packet, a selector 22 coupled to the output of address filter 21 for selectively coupling the output of address filter 21 to a logical link control processor 23 which performs logical link control in accordance with the IEEE 802.2 standards if selector 22 detects that the packet currently being transmitted has the MAC (Medium Access Control) address of the ISDN interface unit 4, or to an LAPD processor 24 which processes signals in accordance with the CCITT Recommendation I. 441. The transmit section of each data terminal equipment 1 comprises a multiplexer 25 which multiplexes packets from LLC and LAPD processors 23 and 24 onto the bus 10. LAPD processor 24 enters the MAC address of the ISDN interface unit 4 into the destination address (DA) field of a packet and enters its own MAC address into the source address (SA) field of the packet and applies it through the multiplexer 25 to the bus 10.

Packets from data terminals are transmitted through subscriber lines 3-1 and received by an address filter 41 of the interface unit 4. Address filter 41 detects that a packet currently being transmitted has the address of the interface unit 4 and allows it to be passed to a lookup table 42 to establish a relationship between a data terminal's MAC address and a TEI (Terminal Endpoint Identifier) value in a manner as will be described and also applied to a packet deassembler 43 where the packet being transmitted is deassembled and a frame is extracted from it and applied to the D-channel handler 5, and source and destination addresses and a frame check sequence are discarded.

Figure 2:
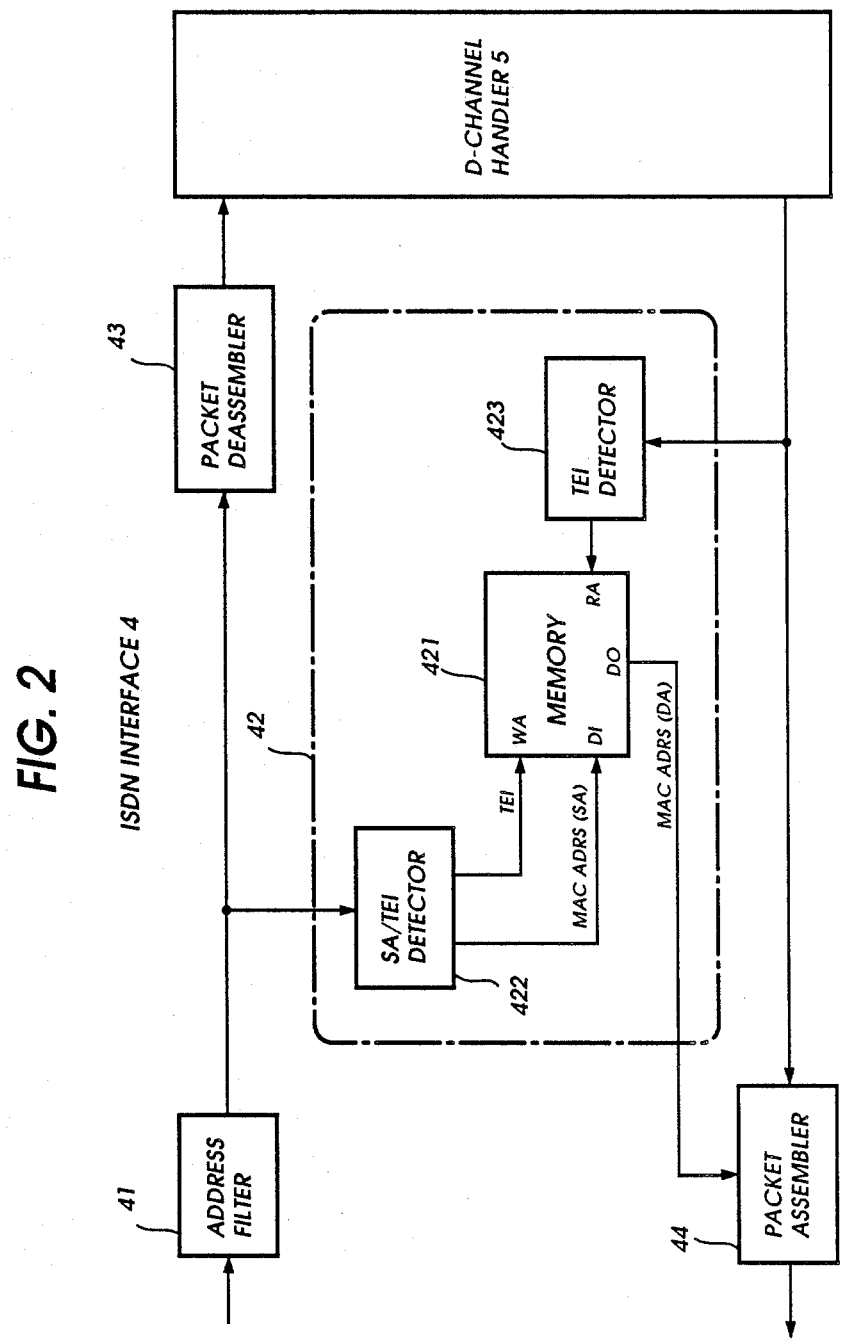
FIG. 2 is a block diagram of an ISDN interface unit of the embodiment of FIG. 1.

A frame to be sent from D-channel handler 5 to a data terminal, on the other hand, is supplied to lookup table 42 to recall an address stored therein and further to a packet assembler 44 where the frame is encapsulated with necessary source and destination addresses and a frame check sequence into a packet and transmitted through a subscriber line 3-2 to the bus 10. As illustrated in FIG. 2, lookup table 42 comprises a memory 421, an SA/TEI field detector 422 connected to the output of address filter 41 and a TEI field detector 423 connected to the output of D-channel handler 5. The SA/TEI field detector 422 extracts copies of the TEI and source address (SA) values contained in a packet in the FIG. 3a format received from a data terminal and applies the extracted copy of the TEI value to the write address input WA of memory 421 and the extracted copy of the source address to the data input DI of memory 421. Memory 421 establishes a relationship between SA and TEI for a given data terminal by storing the extracted SA value as an address of the responding terminal in a location addressable as a function of the extracted TEI value. In this way, a mapping table for data terminals 1—1 to 1-n can be created in the memory 421. The TEI field detector 423, on the other hand, extracts a copy of a TEI value contained in a frame (see FIG. 4) from the D-channel handler 5 and applies it to the read address input RA of the memory 421, so that the stored address of a data terminal is recalled out of the memory and supplied to the packet assembler 44. Packet assembler 44 enters this recalled address, i.e., the MAC layer address of a called data terminal, into the destination address field of a packet currently being assembled and enters the address of the interface unit 4 into the source address field of the packet as shown in FIG. 3a and forwards it to the local area network 2.

The operation of the system is as follows. Assume that a command frame is transmitted from data terminal 1-2 to the D-channel handler 5. The LAPD processor 24 of terminal 1-2 enters the MAC address of ISDN interface unit 4 into the DA field of an LAPD packet and its own MAC address "m2", for example, into the SA field of the packet and enters a preferred TEI value set to "2" (binary "000 0010"), for example, into the TEI field of the packet and encapsulates them with an unnumbered command frame (ID request) and forwards it to the multiplexer 25. The packet is transmitted through bus 10 to ISDN interface unit 4 and passed through address filter 41 to the packet deassembler 43 for application to D-channel handler 5 on the one hand and to the lookup table 42 on the other. Using the SA and TEI fields of the packet being received, lookup table 42 establishes a corresponding relationship between TEI=2 and MAC address=m2 by storing the latter into a location addressable as a function of a TEI value which is equal to "2".

In return, the D-channel handler 5 enters a TEI value set to "2" into an LAPD frame of the FIG. 4 format to form an unnumbered ID response. This frame is applied to the read address input RA of the lookup table 42 and to the packet assembler 44. MAC address (=m2) is read out of lookup table 42 in response to the extracted TEI value and applied to the packet assembler 44. The latter enters the "m2" address value read out of the memory 24 into the destination address (DA) field of the ID response frame and enters the MAC address of ISDN interface unit 4 into the SA field of the frame and sends it to the bus 10.

On receipt of this frame the selector 22 of data terminal 1-2 detects that the source address field of the unnumbered frame currently being transmitted has the MAC address of interface unit 4 and forwards this frame to the LAPD processor 24.

If the data terminal 1-2 is assigned a TEI value set to 21 (binary "001 0101") and another TEI value set to 22 (binary "001 0110"), for example, the lookup table 42 establishes a first relationship between TEI=21 and MAC address=m2 and a second relationship between TEI=22 and MAC address=m2 in accordance with the address data contained in an LAPD packet received from terminal 1-2. Return packet from D-channel handler 5 to data terminal 1-2 includes a DA field containing m2 and a TEI field containing TEI values set to 21 and 22. Whenever there is a change in the Terminal Endpoint Identifier of any data terminal, lookup table 42 updates its contents by altering the address relationship of the transmitting terminal in accordance with the new TEI value contained in the received packet.

It is seen therefore that additional procedures, which would involve communicating an altered TEI value to the network from a terminal and communicating confirmation to the terminal, is not required in the present invention.

FIG. 6 is a block diagram of a modification of the lookup table of the previous embodiment. In this modification, the lookup table is designated 42A and includes a memory 421A, an SA/Ai field detector 422A, a TEI field detector 423A and a check response detector 424A. Memory 421A is initially set at the time of shipment or installation so that the group address of LAN 2 can be read out of the memory in response to a TEI value set to 127 in the TEI field of a frame from the D-channel handler 5 or a MAC address of a TEI-assigned data terminal in response to an individual TEI value (in the range between 0 and 126) set in the TEI field of that frame. The TEI field detector 423A provides the detection of such a TEI value and applies it to the read address input RA of memory 421A to read a stored address out of the memory into the packet assembler 44 to be inserted to the destination field of a packet being assembled. Check response detector 424A detects that a packet currently being transmitted is an identity check response and activates the SA/Ai field detector 422A. The latter extracts copies of data contained in the SA and Ai fields of the response packet, the copy of the SA value being applied to the data input DI of memory 421A and the copy of a TEI value set in the Ai field of the packet being applied to the write address input WA of memory 421A so that the SA value is stored as a destination address of the responding data terminal in a location addressable as a function of a TEI value set in the TEI field of a check request frame from the ASP of D-channel handler 5. In this way, the initially set address values can be updated to a preferred value.

The TEI management procedure as specified in the CCITT Recommendation I. 141 comprises the TEI assignment procedure as described above (with reference to FIGS. 4 and 5) and a TEI check routine procedure which is used in connection with an identity request which is treated in a manner described with reference to the previous embodiment or used for updating TEI status data as an audit procedure. According to the TEI check routine procedure between an assignment service point of the network and a user terminal, the assignment service point within the D-channel handler 5 initially transmits an unnumbered identity check request frame (UI) to the ISDN interface unit 4 by setting the SAPI value to 63 (binary "11 1111"), the TEI value to 127 (binary "111 1111"), the ID (management entity identifier) value to 15 (binary "0000 1111" indicating TEI assignment control), the action indicator Ai to a TEI value which is to be checked, setting the DA (destination address) field to the group address of LAN 2 and the SA field to the address of the interface unit 4

(see FIG. 7). A data terminal specified by the TEI value in the Ai field of the check request returns an unnumbered identity check response packet (UI) containing the same SAPI and TEI values as set in the check request packet and a message type value set to 5 (binary "0000 0101" indicating a check response) and an Ai value set to the assigned TEI value, with the DA and SA fields to the interface address and its own terminal address, respectively. The same check routine procedure as specified by the aforesaid CCITT Recommendation is performed between the ISDN interface unit 4 and the ASP of the D-channel handler 5 as shown in FIG. 7.

In more detail, the application of such an identity check request frame (UI) from D-channel handler 5 to interface unit 4 causes its TEI field detector 423A to extract a copy of a TEI value set in the TEI field of the check request frame and supplies it to the read address input RA of memory 421A. The initially set group address of LAN 2 is read out of the data output terminal of memory 421A into the packet assembler 44 if the value in the TEI field of the frame is "127" and set into the DA field of the frame and encapsulated with an SA address value set to the address of ISDN interface unit 4 and a frame check sequence and transmitted to the LAN 2 as an identity check request packet. This packet is received by the LAPD processor 24 of a data terminal specified by the TEI value in the Ai field of the received packet.

An identity check response packet is generated by the LAPD processor 24 of the TEI-specified terminal and sent to the interface unit 4, containing the address of this data terminal in the SA field and a DA value set to the address of the interface unit 4, regardless of a TEI value to be contained in a response packet currently be assembled, as well as the information just mentioned above. This response packet is passed through address filter 41 to check response detector 424A and to the packet deassembler 43. Thus, the SA/Ai field detector 424A is activated to extract a copy of the address of the responding data terminal and a copy of a TEI value set in the Ai field of the packet to establish their relationship in the memory 421A, whereby the initially set address value is updated with a preferred value.

The foregoing description shows preferred embodiments of the present invention. Various modifications are apparent to those skilled in the art without departing from the scope of the present invention which is only limited by the appended claims.

What is claimed is:

1. A method for interconnecting a plurality of data terminals of a local area network and an integrated services digital network (ISDN), said ISDN being capable of assigning Terminal Endpoint Identifier (TEI) values respectively to data terminals which are accessible through a common interface unit to said network, each of said data terminals being assigned an address value and capable of transmitting a terminal-to-network LAPD (Link Access Protocol on the D-channel) packet to said interface unit, said interface unit being assigned an address value, the method comprising:

transmitting from said interface unit to said data terminals a network-to-terminal LAPD packet containing a TEI value of group address, an action indicator set to an assigned TEI value and a destination address value of a group address of said data terminals; and transmitting from the data terminal specified by the assigned TEI value a said terminal-to-network LAPD packet containing the address value of said interface unit as a destination address and said assigned TEI value contained in said network-to-terminal LAPD packet.

2. A method for controlling the management of addresses for an integrated services digital network (ISDN) capable of assigning ISDN address values respectively to a plurality of data terminals which are accessible through a common interface unit to said network, each of said data terminals being preassigned an address value and capable of receiving a packet containing an ISDN address value assigned thereto and transmitting a terminal-to-network LAPD (link access protocol on the D-channel) packet to said interface unit, said terminal-to-network LAPD packet containing the address value of the transmitting data terminal and an ISDN address value assigned to said transmitting data terminal, the method comprising:

receiving said terminal-to-network LAPD packet by said interface unit and creating in said interface unit a table describing a relationship between an ISDN address value and a source address value both contained in said received LAPD packet;

receiving an LAPD signal from said network by said interface unit and recalling an address value from said table in response to an ISDN address value contained in the received LAPD signal; and entering the recalled address value into the received LAPD signal as a destination address to form a network-to-terminal LAPD packet and transmitting same to said data terminals.

3. A method as claimed in claim 2, further comprising:

detecting a TEI (Terminal Endpoint Identifier) value indicating a group address in said LAPD signal from said network and entering the detected TEI value into said network-to-terminal LAPD packet as a source address; and entering the address of said interface unit into said terminal-to-network LAPD packet in response to receipt of said network-to-terminal LAPD packet by each of said data terminal, regardless of the TEI value contained in said terminal-to-network LAPD packet.

4. A method as claimed in claim 2, further comprising:

detecting that said terminal-to-network LAPD packet is a TEI check response;

creating a second table describing a relationship between a source address value and a TEI value of an action indicator of said TEI check response; and recalling an address value from said memory in response to a TEI value contained in said LAPD signal from said network.

5. A method for controlling the management of Terminal Endpoint Identifier (TEI) values for an integrated services digital network (ISDN) capable of assigning TEI values respectively to a plurality of data terminals which are accessible through a common interface unit to said network, each of said data terminals being preassigned an address value and capable of receiving a packet containing a TEI value assigned thereto and transmitting a terminal-to-network LAPD (link access protocol on the D-channel) packet to said interface unit, said terminal-to-network LAPD packet containing the address value of the transmitting data terminal and a TEI value assigned to said transmitting data terminal, the method comprising:

receiving said terminal-to-network LAPD packet by said interface unit and creating a table describing a relationship between the TEI value and address value both contained in said received LAPD packet;

recalling an address value from said table in response to a TEI value contained in an LAPD signal from said network; and receiving said LAPD signal from said network and entering the recalled address value as a destination address into the received LAPD signal to form a network-to-terminal LAPD packet and transmitting same to said data terminals.

6. A method for controlling the management of Terminal Endpoint Identifier (TEI) values for an integrated service digital network (ISDN) capable of assigning TEI value values respectively to a plurality of data terminals which are accessible through a common interface unit to said network, each of said data terminals being preassigned an address value and capable of receiving a packet containing a TEI value value assigned thereto and transmitting a terminal-to-network LAPD (link access protocol on the D-channel) packet to said interface unit, said terminal-to-network LAPD packet containing the address value of the transmitting data terminal and a TEI value value assigned to said transmitting data terminal, said method comprising:

detecting that said terminal-to-network LAPD packet is a TEI check response;

creating a table describing a relationship between a source address value and a TEI value of an action indicator of said TEI check response;

recalling an address value from said table in response to a TEI value contained in said LAPD signal from said network; and receiving said LAPD signal from said network and entering the recalled address value as a destination address into the received LAPD signal to form a network-to-terminal LAPD packet and transmitting same to said data terminals.

7. A communications system for an integrated services digital network (ISDN), comprising a plurality of data terminals and a common interface unit, said ISDN being capable of assigning Terminal Endpoint Identifier (TEI) values respectively to said data terminals which are accessible through said common interface unit to said network, each of said data terminals being assigned an address value and capable of transmitting a terminal-to-network LAPD (Link Access Protocol on the D-channel) packet to said interface unit, containing the address value of the transmitting data terminal and a TEI value assigned to said transmitting data terminal, said interface unit being assigned an address value and capable of transmitting to said data terminals a network-to-terminal LAPD packet containing a TEI value of group address, an action indicator set to an assigned TEI value, and a destination address value set to a group address of said data terminals, wherein one of said data terminals which is specified by the assigned TEI value is capable of setting the address value of said interface unit into said terminal-to-network LAPD packet as a destination address and setting a TEI value equal to said assigned TEI value contained in said network-to-terminal LAPD packet.

8. A communications system for an integrated services digital network (ISDN), comprising a plurality of data terminals and a common interface unit, said ISDN being capable of assigning ISDN address values respectively to said data terminals which are accessible through said common interface unit to said network, each of said data terminals being preassigned an address value and capable of receiving a packet containing an ISDN address value assigned thereto and transmitting a terminal-to-network LAPD (link access protocol on the D-channel) packet to said interface unit, said terminal-to-network LAPD packet containing the address value of the transmitting data terminal and an ISDN address value assigned to said transmitting data terminal, said interface unit comprising:

a memory;

write access means for receiving said terminal-to-network LAPD packet and establishing in said memory a relationship between an ISDN address value and a source address value both contained in said received LAPD packet;

read access means for recalling an address value from the memory in response to an ISDN address value contained in an LAPD signal from said network; and packet assembly means for receiving said LAPD signal from said network and entering the recalled address value into the received LAPD signal as a destination address to form a network-to-terminal LAPD packet and transmitting same to said data terminals.

9. A communications system as claimed in claim 8, wherein said interface unit further comprises means for detecting a TEI (terminal endpoint indicator) value set to a group address in said LAPD signal from said network and entering a group address of said data terminals into said network-to-terminal LAPD packet as a destination address and setting an action indicator of said packet to a TEI value specifying one of said data terminals, and wherein the data terminal which is specified by said TEI value of said action indicator is capable of setting the address value of said interface unit into said terminal-to-network LAPD packet as a destination address, regardless of a TEI value contained in the last-mentioned packet.

10. A communications system as claimed in claim 8, wherein said interface unit further comprises:

means for detecting that said terminal-to-network LAPD packet is a TEI check response;

second write access means for establishing in said memory a relationship between a source address value and a TEI value of an action indicator of said TEI check response; and second read access means for recalling an address value from said memory in response to a TEI value contained in said LAPD signal from said network.

11. A communications system for an integrated services digital network (ISDN), comprising a plurality of data terminals and a common interface unit, said ISDN being capable of assigning Terminal Endpoint Identifier (TEI) values respectively to said data terminals which are accessible through said common interface unit to said network, each of said data terminals being preassigned an address value and capable of receiving a packet containing a TEI value assigned thereto and transmitting a terminal-to-network LAPD (link access protocol on the D-channel) packet to said interface unit, said terminal-to-network LAPD packet containing the address value of the transmitting data terminal and a TEI value assigned to said transmitting data terminal, said interface unit comprising:

a memory;

write access means for receiving said terminal-to-network LAPD packet and establishing in said memory a relationship between the TEI value and address value both contained in said received LAPD packet;

read access means for recalling an address value from the memory in response to a TEI value contained in an LAPD signal from said network; and packet assembly means for receiving said LAPD signal from said network and entering the recalled address value as a destination address into the received LAPD signal to form a network-to-terminal LAPD packet and transmitting same to said data terminals.

12. A communications system for an integrated services digital network (ISDN), comprising a plurality of data terminals and a common interface unit, said ISDN being capable of assigning TEI (Terminal Endpoint Identifier) value values respectively to said data terminals which are accessible through said common interface unit to said network, each of said data terminals being preassigned an addres value and capable of receiving a packet containing a TEI value value assigned thereto and transmitting a terminal-to-network LAPD (link access protocol on the D-channel) packet to said interface unit, said terminal-to-network LAPD packet containing the address value of the transmitting data terminal and a TEI value value assigned to said transmitting data terminal, said interface unit comprising:

means for detecting that said terminal-to-network LAPD packet is a TEI check response;

write access means for establishing in said memory a relationship between a source address value and a TEI value of an action indicator of said TEI check response;

read access means for recalling an address value from said memory in response to a TEI value contained in said LAPD signal from said network; and packet assembly means for receiving said LAPD signal from said network and entering the recalled address value as a destination address into the received LAPD signal to form a network-to-terminal LAPD packet and transmitting same to said data terminals.

* * * * *